(12) United States Patent
Cheng

(10) Patent No.: US 10,359,557 B2
(45) Date of Patent: Jul. 23, 2019

(54) LIGHT GUIDE PLATE HAVING PERIODIC MICROSTRUCTURE CONFIGURED ON LIGHT EMISSION SURFACE AND A LIGHT WAVEGUIDE LAYER CONFIGURED WITHIN TRANSMISSION LAYER AND BACKLIGHT MODULE HAVING A COLLIMATION STRUCTURE CONFIGURED WITH A PLURALITY OF COLLIMATION-LAYER UNITS AND A PLURALITY OF COLLIMATION-OPTICAL-LENS UNITS TO COLLIMATE LIGHT BEAMS EMITTED FROM THE LIGHT EMISSION SURFACE OF THE LIGHT GUIDE PLATE

(71) Applicant: Wuhan China Star Optoelectronics Technology Co., Ltd., Wuhan, Hubei (CN)

(72) Inventor: Yan Cheng, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 88 days.

(21) Appl. No.: 15/533,023

(22) PCT Filed: May 25, 2017

(86) PCT No.: PCT/CN2017/085843
§ 371 (c)(1),
(2) Date: Jun. 4, 2017

(87) PCT Pub. No.: WO2018/201536
PCT Pub. Date: Nov. 8, 2018

(65) Prior Publication Data
US 2018/0321433 A1 Nov. 8, 2018

(51) Int. Cl.
*F21V 8/00* (2006.01)

(52) U.S. Cl.
CPC ........... *G02B 6/0036* (2013.01); *G02B 6/005* (2013.01); *G02B 6/0028* (2013.01); *G02B 6/0061* (2013.01)

(58) Field of Classification Search
CPC combination set(s) only.
See application file for complete search history.

(56) References Cited

U.S. PATENT DOCUMENTS 7,950,838 B2  5/2011  Johnson et al.
8,350,986 B2  1/2013  Ouchi et al.
(Continued)

FOREIGN PATENT DOCUMENTS

CN  101718417 A  6/2010
CN  104848092 A  8/2015
(Continued)

*Primary Examiner* — Alan B Cariaso
(74) *Attorney, Agent, or Firm* — Andrew C. Cheng

(57) ABSTRACT

The present disclosure relates to a light guide plate and a backlight module thereof, wherein the light guide plate includes: a light incident surface, a transmission layer, and a light emission surface. Wherein a light waveguide layer is configured within the transmission layer to change a transmission direction of at least a portion of light beams entered from the light incident surface along a direction perpendicular to the light emission surface. At least one periodic microstructure is configured on the light emission surface. The present disclosure may improve convergence characteristics of the light beams entered the light guide plate and may reduce the crosstalk between areas.

8 Claims, 4 Drawing Sheets

(56) References Cited

U.S. PATENT DOCUMENTS

| | | | |
|---|---|---|---|
| 9,709,721 B2 | 7/2017 | Gourlay | |
| 9,810,817 B2 | 11/2017 | Campbell et al. | |
| 9,810,943 B2 | 11/2017 | Whitehead et al. | |
| 2012/0306861 A1* | 12/2012 | Minami | G02B 27/2214 345/419 |
| 2013/0264470 A1* | 10/2013 | Nishiwaki | G02B 6/0036 250/216 |
| 2014/0321164 A1* | 10/2014 | Hsu | G02B 6/0065 362/629 |
| 2017/0261677 A1* | 9/2017 | Tai | G02B 6/0036 |
| 2017/0307800 A1* | 10/2017 | Fattal | G02B 6/0038 |
| 2017/0315374 A1 | 11/2017 | Zhou et al. | |

FOREIGN PATENT DOCUMENTS

| | | |
|---|---|---|
| CN | 205592775 U | 9/2016 |
| CN | 106526973 A | 3/2017 |
| CN | 206096703 U | 4/2017 |

\* cited by examiner

LIGHT GUIDE PLATE HAVING PERIODIC MICROSTRUCTURE CONFIGURED ON LIGHT EMISSION SURFACE AND A LIGHT WAVEGUIDE LAYER CONFIGURED WITHIN TRANSMISSION LAYER AND BACKLIGHT MODULE HAVING A COLLIMATION STRUCTURE CONFIGURED WITH A PLURALITY OF COLLIMATION-LAYER UNITS AND A PLURALITY OF COLLIMATION-OPTICAL-LENS UNITS TO COLLIMATE LIGHT BEAMS EMITTED FROM THE LIGHT EMISSION SURFACE OF THE LIGHT GUIDE PLATE

BACKGROUND OF THE INVENTION

1. Field of the Invention

The present disclosure relates to the backlight module of light emitting display (LED) field, and more particularly to a light guide plate and a backlight module thereof.

2. Discussion of the Related Art

The high-dynamic range (HDR) images may provide wider dynamic range and more image details comparing with regular images. According to the low-dynamic range (LDR) images of different exposure time, the ultimate HDR image is synthesized by the LDR images with optimistic details of each LDR images with different exposure time, so as to display the visual effect of the real environment.

The local dimming technique is vital to the sensor within the mobile device for synthesizing the HDR images. The local dimming technique is a local backlight adjustment technology capable of adjusting the backlight according to the brightness of the images. The brightness of the highlight portion of the image may reach a further higher level via the local dimming technique, and the brightness of the dark portion of the image may be further reduced or even be switched off, so as to achieve the optimistic contrast. The local dimming technique mainly includes 1D local dimming technique and 2D local dimming technique.

The 2D local dimming technique may only be applied to large-sized devices, such as television and monitor, due to the 2D local dimming technique of the bottom-lighting type backlight module may be realized much easier in large-sized. However, it's different to control the optical crosstalk between different areas for small-sized devices when the 1D local dimming technique in small-sized is adopted.

SUMMARY

The present disclosure relates to a light guide plate, including: a light incident surface, a transmission layer, a light emission surface; wherein a light waveguide layer is configured within the transmission layer to change a transmission direction of at least a portion of light beams entered from the light incident surface to a direction perpendicular to the light emission surface; at least one periodic microstructure is configured on the light emission surface.

In another aspect, the present disclosure relates to a backlight module, including: a light source and a light guide plate; wherein the light guide plate is configured with a light incident surface, a transmission layer, and a light emission surface; a light waveguide layer is configured within the transmission layer to change a transmission direction of at least a portion of light beams entered from the light incident surface to a direction perpendicular to the light emission surface; at least one periodic microstructure is configured on the light emission surface; the light source corresponds to the light incident surface of the light guide plate.

In view of the above, the present disclosure may improve convergence characteristics of the light beams entered the light guide plate and may reduce the crosstalk between areas by the light waveguide layer configured within the light guide plate. Comparing with the prior art, micro structures of the light incident surface and light emission surface of the light guide plate in the present disclosure is changed, so that the light waveguide layer configured within the light guide plate may improve convergence characteristics of the light beams entered the light guide plate and may greatly reduce the crosstalk between areas.

DETAILED DESCRIPTION OF THE EMBODIMENTS

The embodiments of the present disclosure will now be described more fully hereinafter with reference to the accompanying drawings, in which embodiments of the invention are shown.

Figure 1:
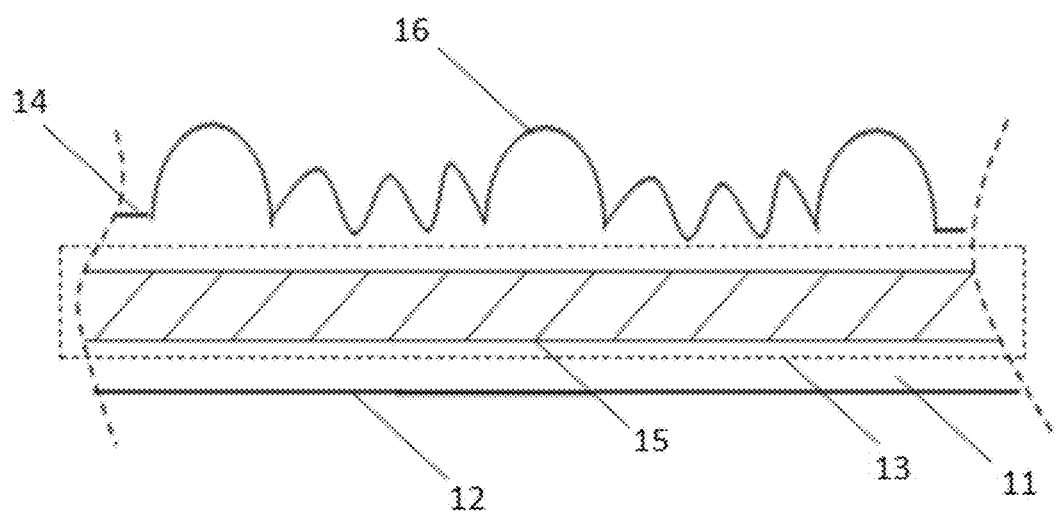
FIG. 1 is a schematic view of a light guide plate in one embodiment of the present disclosure.

As shown in FIG. 1, the present disclosure relates to a light guide plate 11, including: a light incident surface 12, a transmission layer 13, and a light emission surface 14. A light waveguide layer 15 is configured within the transmission layer 13 to change a transmission direction of at least a portion of light beams entered from the light incident surface 12 to a direction perpendicular to the light emission surface 14. At least one periodic microstructure 16 is configured on the light emission surface 14.

A surface of the light guide plate 11 includes a plurality of bright areas and a plurality of dark areas, and each of the bright areas and the dark areas correspond to at least one of the periodic microstructure 16.

Figure 2:
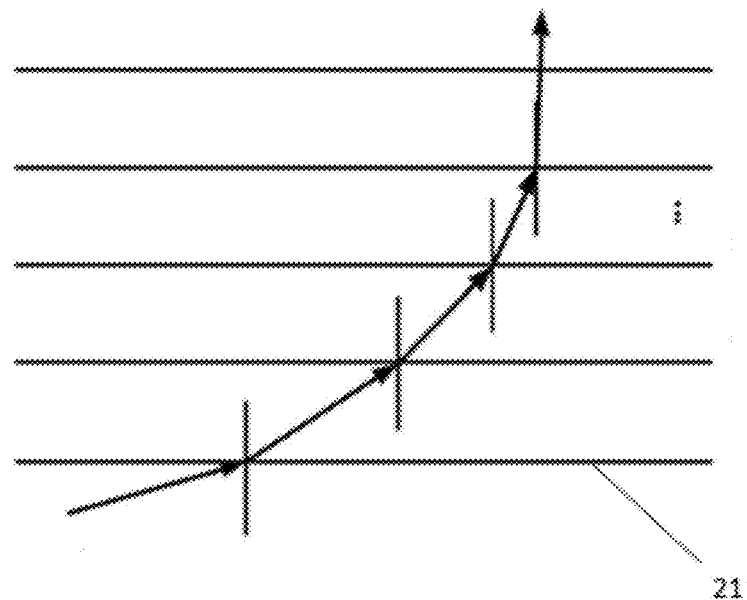
FIG. 2 is a light path diagram of a light waveguide layer of light guide plates in one embodiment of the present disclosure.

As shown in FIG. 2, the light waveguide layer 15 includes a plurality of transparent media layers 21. Refractive indexes of the transparent media layers 21 increase gradually along the transmission direction of the light beams. In one example the transparent media layers 21 are made of different materials. In another example, the transparent media layers 21 are made of the same material with different density.

In view of the above, the present disclosure may improve convergence characteristics of the light beams entered the light guide plate and may reduce the crosstalk between areas by the light waveguide layer configured within the light guide plate. Comparing with the prior art, micro structures of the light incident surface and light emission surface of the light guide plate in the present disclosure is changed, so that the light waveguide layer configured within the light guide plate may improve convergence characteristics of the light beams entered the light guide plate and may greatly reduce the crosstalk between areas.

Figure 3:
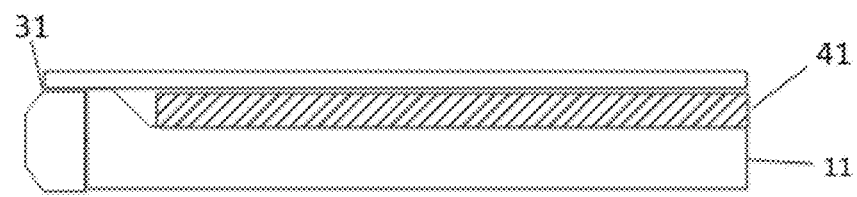
FIG. 3 is a side view of a backlight module in one embodiment of the present disclosure.

As shown in FIG. 3, the present disclosure relates to a backlight module, including: a light source 31, the light incident surface 12, the light guide plate corresponding to the light source 31, and a collimation structure 41 corresponding to the light emission surface 14 of the light guide plate.

Figure 4:
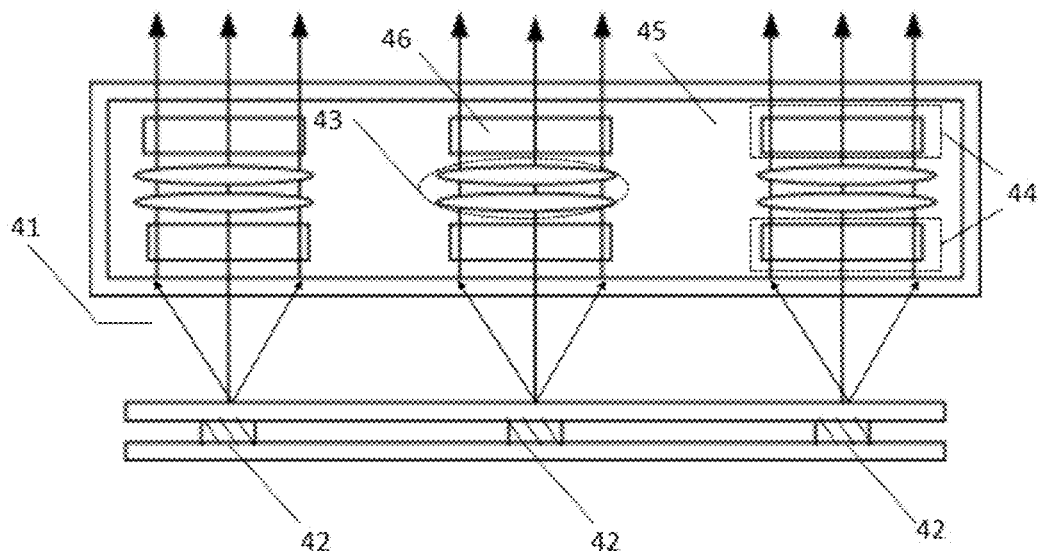
FIG. 4 is a schematic view of a collimation structure of backlight modules in one embodiment of the present disclosure.

As shown in FIG. 4, the light guide plate 11 is configured with the light incident surface 12, the transmission layer 13, and the light emission surface 14. The light waveguide layer 15 is configured within the transmission layer 13 to change the transmission direction of at least a portion of the light beams entered from the light incident surface 12 to the direction perpendicular to the light emission surface 14. At least one periodic microstructure 16 is configured on the light emission surface 14.

The surface of the light guide plate 11 includes the bright areas and the dark areas, and each of the bright areas and the dark areas corresponds to at least one of the periodic microstructure 16.

The light waveguide layer 15 includes the transparent media layers 21. The refractive indexes of the transparent media layers 21 increase gradually along the transmission direction of the light beams. In one example the transparent media layers 21 are made of different materials. In another example, the transparent media layers 21 are made of the same material with different density.

As shown in FIG. 4, the collimation structure 41 is configured with a plurality of collimation-layer units 42, a plurality of collimation-optical-lens units 43, a first fixing structure 44, and a second fixing structure 45. The collimation structure 41 is configured to collimate the light beams emitted from the light emission surface. Each of the collimation-layer units 42 corresponds to at least one of the periodic microstructures 16, and each of the collimation-optical-lens units 43 corresponds to one of the collimation-layer unit 42. The first fixing structure 44 is configured with two transparent flat plates 46, and the collimation-optical-lens units 43 are sandwiched between the transparent flat plates 46. The second fixing structure 45 is configured with a transparent cavity, and the collimation-optical-lens units 43 are configured within the second fixing structure 45.

Figure 5:
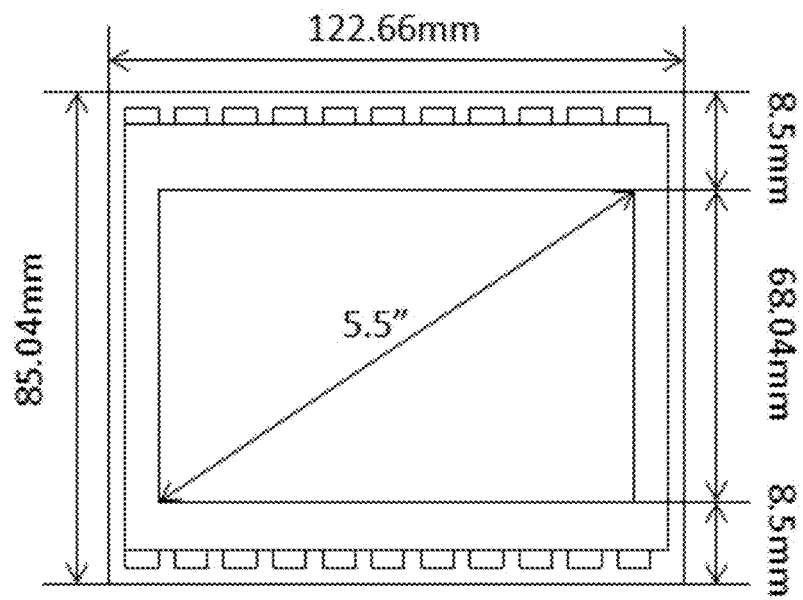
FIG. 5 is a schematic view of a backlight module in one embodiment of the present disclosure.
Figure 6:
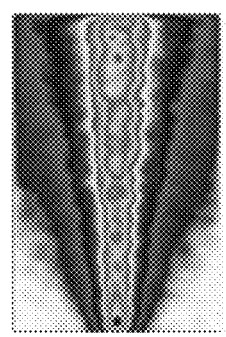
FIG. 6 is a schematic view illustrating of a diffusion ratio of partition interference in the prior art.
Figure 7:
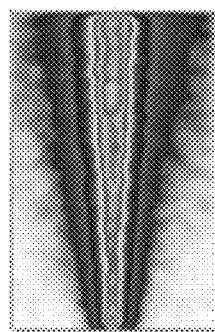
FIG. 7 is a diagram illustrating of a diffusion ratio of partition interference in the present disclosure.

The Diffusion ratio F is a criterion to evaluate the partition interference. Under an ideal state of light convergence, to define ratio of a half peak width of a brightness distribution in a position at nine out of ten of total light transmission distance to a position at one tenth of the total light transmission distance as one. The backlight module shown in FIG. 5 is sized in 5.5 inches. The backlight module is only partitioned within the light guide plate and is without the configuration of the light waveguide layer 15 and the collimation structure 41. As shown in FIG. 6, when opening lamp beads of controllable areas, the diffusion ratio F is 2.8, and the test result of the present disclosure as shown in FIG. 7 is 1.78. FIG. 6 and FIG. 7 are in the same proportion of drawing.

In view of the above, the present disclosure may improve convergence characteristics of the light beams entered the light guide plate and may reduce the crosstalk between areas by the light waveguide layer configured within the light guide plate.

The above description is only the embodiments in the present disclosure, the claim is not limited to the description thereby. The equivalent structure or changing of the process of the content of the description and the figures, or to implement to other technical field directly or indirectly should be included in the claim.

What is claimed is:

1. A backlight module, comprising:
   a light guide plate configured with a light incident surface, a transmission layer, and a light emission surface, wherein a light waveguide layer is configured within the transmission layer to change a transmission direction of at least a portion of light beams entered from the light incident surface to a direction perpendicular to the light emission surface;
   at least one periodic microstructure configured on the light emission surface;
   a light source corresponding to the light incident surface of the light guide plate;
   a collimation structure configured on one side of the light guide plate, wherein the collimation structure is configured to collimate light beams emitted from the light emission surface, and the collimation structure is configured with a plurality of collimation-layer units and a plurality of collimation-optical-lens units; the collimation structure comprises a first fixing structure configured with two transparent flat plates, the collimation-optical-lens units sandwiched between the transparent flat plates; and a second fixing structure configured with a transparent cavity, the collimation-optical-lens units configured within the transparent cavity.

2. The backlight module according to claim 1, wherein each of the collimation-layer units corresponds to at least one of the periodic microstructures.

3. The backlight module according to claim 1, wherein each of the collimation-optical-lens units corresponds to one of the collimation collimation-layer unit.

4. A light guide plate, comprising:
   a light incident surface;
   a transmission layer;
   a light emission surface;
   wherein a light waveguide layer is configured within the transmission layer to change a transmission direction of at least a portion of light beams entered from the light incident surface to a direction perpendicular to the light emission surface;
   at least one periodic microstructure is configured on the light emission surface;
   a surface of the light guide plate comprises a plurality of bright areas and a plurality of dark areas, and each of the bright areas and the dark areas corresponds to at least one of the periodic microstructure.

5. The light guide plate according to claim 4, wherein the light waveguide layer comprises a plurality of transparent media layers, and refractive indexes of the transparent media layers increase gradually along the transmission direction of the light beams.

6. The light guide plate according to claim 4, wherein the transparent media layers are made of different materials.

7. The light guide plate according to claim 4, wherein the transparent media layers are made of the same material with different density.

8. A backlight module, comprising:
   a light source;
   a light guide plate; and
   a collimation structure;

wherein the light guide plate is configured with a light incident surface, a transmission layer, and a light emission surface; a light waveguide layer is configured within the transmission layer to change a transmission direction of at least a portion of light beams entered from the light incident surface to a direction perpendicular to the light emission surface; at least one periodic microstructure is configured on the light emission surface; the light source corresponds to the light incident surface of the light guide plate;

wherein the collimation structure is configured on one side of the light guide plate, and is configured to collimate the light beams emitted from the light emission surface; the collimation structure comprises:

a plurality of collimation-layer units, wherein each of the collimation-layer units corresponds to at least one of the periodic microstructures;

a plurality of collimation-optical-lens units, wherein each of the collimation-optical-lens units corresponds to one of the collimation collimation-layer unit;

a first fixing structure configured with two transparent flat plates, wherein the collimation-optical-lens units are sandwiched between the transparent flat plates; and a second fixing structure configured with a transparent cavity, wherein the collimation-optical-lens units are configured within the transparent cavity.

* * * * *